Patented Oct. 1, 1940

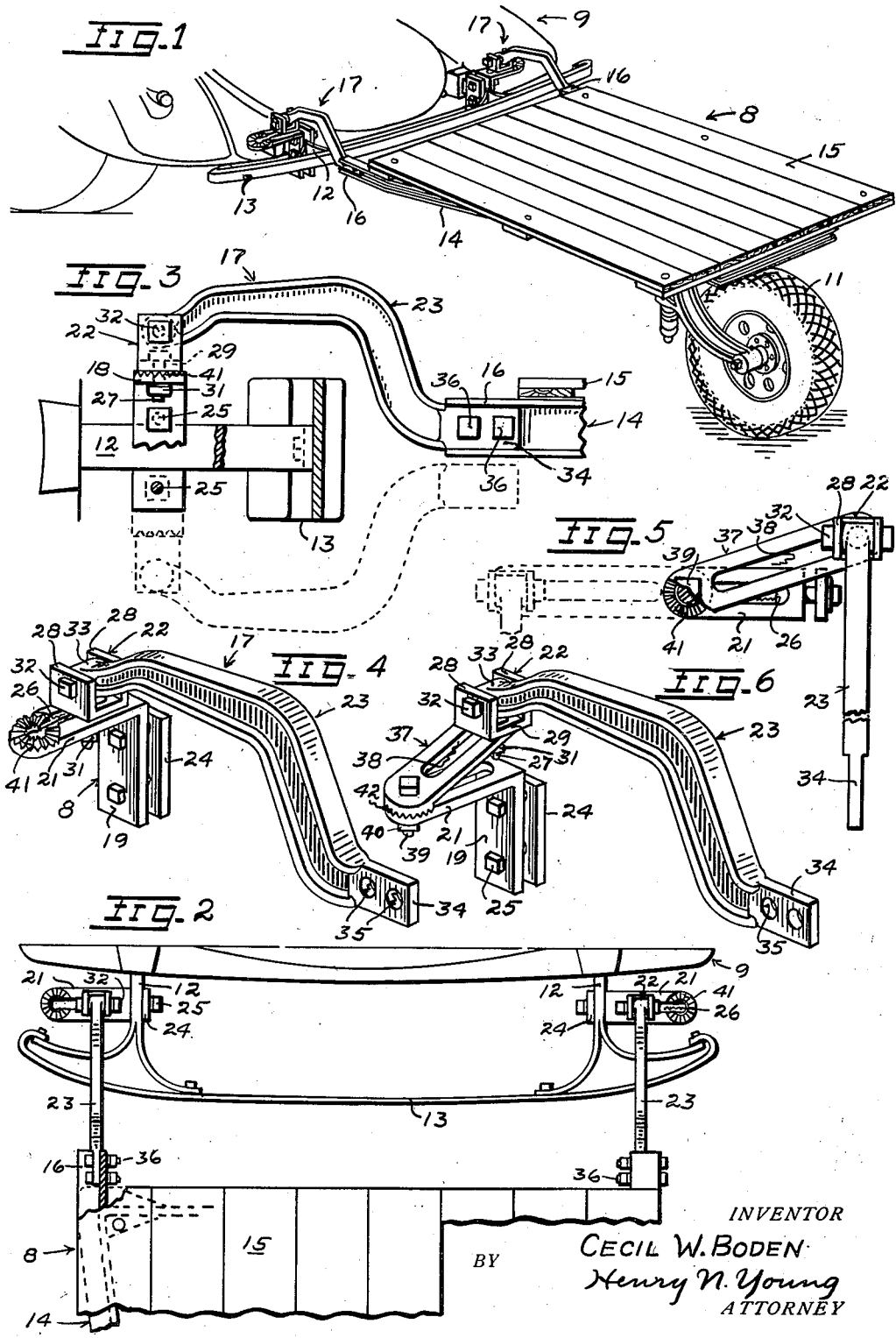

2,216,584

UNITED STATES PATENT OFFICE 2,216,584

TRAILER HITCH

Cecil W. Boden, Oakland, Calif.

Application August 11, 1938, Serial No. 224,348

5 Claims. (Cl. 280—33.44)

The invention relates to a connection or hitch by which a trailer may be releasably attached to a self-propelled road vehicle such as an automobile.

An object of the invention is to provide a trailer hitch which is particularly adapted for use in providing a two-point connection of a trailer to a towing vehicle.

Another object is to provide a hitch of the class described which permits any necessary vertical accommodation for the attachment of a particular trailer to different automobiles, or different trailers to the same automobile, without requiring changes in the automobile structure per se.

A further object is to provide for effecting the attachment to the automobile through a non-resilient portion of the bumper structure provided thereon.

A still further object is to provide a particularly simple and inexpensive and effective hitch of the character described.

The invention possesses other objects and features of advantage, some of which, with the foregoing, will be brought out or be apparent in the following description of a typical embodiment of the invention, and in the accompanying drawing in which, Figure 1 is a perspective view showing a one-wheel trailer attached to a fragmentarily shown automobile by means of the hitch of the present invention.

Figure 2 is an enlarged fragmentary plan view of the arrangement of Figure 1.

Figure 3 is an enlarged side elevation of one of the connections shown in Figures 1 and 2.

Figure 4 is a perspective view of the unapplied hitch assembly.

Figures 5 and 6 are plan and perspective views respectively of another embodiment of the hitch assembly.

By way of illustration, the present trailer hitch device is disclosed as it is operatively applied for effecting a two-point attachment to the rear of an automobile 9 of a trailer 8, said trailer being supported from the road by a single caster wheel 11. The automobile 9 is provided with a usual bumper assembly which comprises mutually spaced bumper supporting bars 12 which extend rearwardly from the vehicle and mount an elongated and more or less resilient bumper member 13 at and between their rear ends; in the present instance, each bar 12 is forked to provide a pair of terminal connections with the supported bumper 13. The trailer structure comprises a flat frame 14 to and beneath the rearward portion of which the caster wheel assembly is fixed, said frame supporting a suitable load-receiving body which in the present instance is represented by a flat platform or bed 15. Attaching tongues 16 extend rigidly from the trailer frame 14 at opposite sides thereof and extend forwardly beyond the bed 15; in the present instance, the tongues 16 comprise integral extensions of longitudinal channel members of the trailer frame and are mutually parallel.

It will be understood that the present automobile and trailer combination is one in which the attached trailer is arranged to move or swing as part of the automobile, and in which the trailer load is supported in a minor part by the automobile. When but one supporting wheel is provided for the trailer, it is necessary that the trailer be attached to the automobile at a pair of laterally spaced points, and the present hitch device has been particularly designed for meeting the requirement. Accordingly, and as illustrated, hitch assemblies or units 17 have been provided for directly connecting the different trailer tongues 16 with the rearwardly directed and corresponding bumper-supporting bars 12 of the automobile, said units being so constituted that their operative installations are independent of the relative spacings of the tongues and bars which are respectively fixed for the vehicles which provide them. It will be recalled that the two-point hitch connection is essential for trailers supported on a plurality of swivel wheels as well as for trailers having but one swivel wheel as has been particularly illustrated.

The hitch units 17 of an operative pair are alike as to their structural elements, but are arranged to have their corresponding parts differently and complementarily related at the two installations if the bars 12 are, as usual, equally spaced from the longitudinal axis of the automobile and the trailer is to be centered behind the automobile. Also, the bars 12 define a plane which is substantially parallel to the wheel base of the automobile which for directional reference purposes will be considered horizontal.

As is shown in Figures 1 to 4 inclusive, each hitch unit 17 includes a right-angle bracket 18 arranged for its fixed mounting on a bumper support bar 12 to have one arm 19 thereof disposed upright and flat against the bar 12 and the other arm 21 thereof disposed horizontally and directed transversely of the bar, a block 22 releasably fixed on the bracket arm 21 for adjustment longitudinally therealong, and a drawbar 23 hinged at one end to the block 22 at an horizontal axis of hinging and having its other end arranged for fixing to a trailer tongue 16.

In the present instance, the fixed mounting of the bracket 18 on the bar 12 is effected by the use of a clamp plate 24 disposed at the opposite side of the bar from the bracket arm 19 and secured in place by bolts 25 engaged between it and the arm 19, and extending above and below the engaged bar. The clamp plate 24 is arranged for its operative installation opposite either face of the bracket arm 19 whereby the bar 12 may be secured between it and either said face to vary the extension of an arm 21 beyond the bar in a given direction and by a distance equal to the combined thicknesses of the bar and the arm 19.

The angle bracket 16 is so disposed on the bar 12 that the horizontally disposed bracket arm 21 extends laterally of the automobile. A slot 26 of uniform width extends transversely through the bracket arm 21 for substantially the full length theerof, and slidably receives a bolt 27 transversely therethrough for fixing the block in adjusted position along the arm. As shown, the block 22 is U-shaped to provide mutually parallel ears 28 extending perpendicularly from a base portion 29 through which the bolt 27 is engaged to have its head disposed against the ear side of its base 29, a nut 31 being mounted on the bolt portion which extends from the opposite side of the arm 21 for tightening up on the bolt to fix the block in place on the arm 21.

Aligned perforations extending horizontally through the ears 28 of the block 22 receive a hinge pin 32 which may comprise a bolt with its portion between the ears unthreaded for bearing engagement in a complementary bore provided in the forward end portion 33 of the drawbar 23 whereby the latter element of the hitch unit is hinged to the block 22, the permitted hinging movement of the drawbar being in an upright plane about an horizontal axis. The rearward end portion 34 of the drawbar 23 is straight and is provided with a plurality of horizontal holes 35 therethrough and parallel to the bore of the forward bar end, said holes being arranged to receive bolts 36 for bolting the drawbar to a tongue 16 of the trailer when the drawbar end 34 is fitted in the channel of the tongue; the arrangement is such that the secured drawbar is rigidly related to the trailer frame and is then operative as an extension of its tongue 16.

Since the bed of the attached trailer should preferably be substantially parallel to the wheel base plane of the towing vehicle, and since automobile bumpers are provided at various heights above said plane, it will now be noted that the present hitch assembly is so constituted and formed that it may be utilized to provide the desired type of connection for a considerable range of height differences between trailer frames and automobile bumper assemblies, or special trailer connection bars, which may extend rearwardly from an automobile.

By particular reference to Figure 3, it will be noted that the bracket 18 and the hinge block 22 appreciably offset the hinge pin 32 above a bar 12 which mounts them, and that the level of the trailer frame 14 is only slightly above the central plane of the bumper assembly. To meet such a situation, the drawbar 23 has its portions 33 and 34 relatively offset laterally thereof in a vertical plane whereby the portion 34 may be in substantial alignment with the trailer frame for its connection to a tongue 16 without appreciably changing the angular relation of the trailer bed to the horizontal, the arrangement at the same time providing an offset around the bumper 13 as is necessary in any event; this form for the drawbar is an important feature of the present hitch unit.

As is indicated in dotted lines in Figure 3, the bracket 18 may be mounted on the bar 12 to dispose the hinge pin 25 below the bar 12 whereby the drawbar would also be installed in the indicated inverted position to dispose its end portion 34 when horizontal at a lower level than the central plane of the bars 12 to provide a connection for a trailer frame which, when level, would be below the level of the bars 12. It will be understood that when a level trailer frame would dispose the connecting tongues thereof out of the level of a mounted and levelled drawbar portion 34 to which it may be attached, the trailer and drawbar may be swung into mutual alignment for their connection without causing an undue tilting of the trailer bed, the feature resulting from the vertically offset form of the drawbar 23 and the provision for the optional disposal of the hinge pin 25 above or below the bars 12.

In practice, an attached trailer may be released by removing the nuts 31 from the bolts 27 whereby the blocks 22 and drawbars 23 may remain attached to the trailer, while only the brackets 18 and clamp plates 24 and bolts 25 remain on the bars 12 without interfering with the normal functioning of the bumper 13. When the trailer is to be reattached, the bolts 27 would be reinserted through the slots 26 of the bracket arms 21 and the nuts 31 replaced and tightened up when the trailer is centered with respect to the automobile.

While the brackets 18 may be mounted on the bars 12 to direct the arms 21 thereof either inwardly or outwardly from the bars 12 in accordance with the mutual spacing of the bars 12 with respect to the mutual spacing of the tongues 16, the slots 26 of the bracket arms 21 may not always be disposable to simultaneously receive the bolts 27 for both hinge blocks 22, and means are provided to meet this contingency. As shown in Figures 5 and 6, added members 37 may be provided and interposed between the blocks 22 and the corresponding bracket arms 21 to increase the adaptability of the hitch to differently spaced trailer tongues and/or differently spaced bumper, or other, bars extending from an automobile to which a given trailer is to be attached. Essentially, the member 37 comprises a flat bar having a bolt-receiving perforation at one end and provided with a transverse slot 38 extending longitudinally therein to receive the bolt 27 of the hinge block 22. A bolt 39 engages the aforesaid bolt hole in the member 37 and is disposed through the slot 26 in the arm 21 and mounts a nut 40 for tightening up to fix the member to the arm in angularly adjusted relation thereto as a continuation thereof.

The member 37 is designed to function as a unitary section and rigid continuation of the arm 21, and means are provided for maintaining a desired angular relation of these elements. As shown, the upper face of the bracket arm 21 is provided with a series of teeth 41 extending radially from the center of the outer end of its slot 26, and arranged for engagement with a mating set of teeth 42 provided on the under face of the member 37 and radiating from the axis of the hole for the bolt 39. Preferably, and as shown, the tops of the teeth 41 are disposed at or inwardly of the upper face of the arm 21 whereby, when the member is omitted, the block 22 may be secured in whole or in part over the teeth 41 while the block base remains parallel to the upper face of the arm 21; the complementary teeth 42 of the member 37 would correspondingly extend downwardly from the plane of the lower face of the member. The use of the member 37 not only increases the range of accommodations for the hitch structure, but also permits some fore-and-aft adjustment of the attached trailer with respect to the towing vehicle.

While the present hitch units are shown as applied for effecting a two-point attachment for a trailer supported from the ground on a swivelled wheel, it will be understood that certain novel features of a hitch unit are advantageously applicable in an arrangement in which but one connection is provided between a trailer and a towing vehicle.

From the foregoing description, taken in connection with the accompanying drawing, the advantages of the trailer hitch of my invention will be readily understood by those skilled in the art to which the invention appertains. While I have described the principle of operation, together with arrangements which I now consider to be preferred embodiments thereof, I desire to have it understood that the showing is primarily illustrative, and that such changes may be made, when desired, as fall within the scope of the followings claims.

I claim:

1. A trailer hitch for connecting towing and trailing vehicles in longitudinal alignment and comprising a bracket for direct and fixed attachment to an element of the towing vehicle and providing an arm which is horizontally disposed and is provided with a slot of uniform width extending longitudinally along and vertically through the arm, a hinge block, a bolt engaged in the block and through the slot for tightening to fix the block to the arm in adjusted position therealong, and a drawbar having an end thereof hinged to said block for a swinging movement about an horizontal axis and having its other end arranged for direct attachment to the trailing vehicle.

2. A structure in accordance with claim 1 wherein the bracket arm comprises sections arranged for angular adjustment about a vertical axis, and means are provided for releasably securing the bracket arm sections unitarily in fixed angular relation.

3. A hitch for connecting towing and trailing vehicles in longitudinal alignment and comprising a bracket for fixed attachment to an element of the towing vehicle and providing an arm which is horizontally disposed, a hinge block mounted on said arm for mutually independent adjustments thereof along the arm and about a vertical axis, a horizontal hinge pin carried by said block, means for rigidly fixing said block to said arm in adjusted position thereon, and a drawbar having an end thereof hingedly engaging said pin on said block for a swinging movement about the pin and having its other end arranged for attachment to the trailing vehicle.

4. In combination with a towing vehicle having a pair of relatively fixed draft bars extending rearwardly therefrom in fixed relation thereto and to each other, and a trailing vehicle having a pair of draft tongues extending forwardly therefrom in fixed relation thereto and to each other, means for attaching the draft tongues to the draft bars and comprising brackets fixed at corresponding points of the draft bars and providing horizontal arms extending transversely of the common axis of the vehicles, hinge blocks providing horizontally disposed hinge pins engaging the forward ends of the draft tongues, and means fixing said hinge blocks on the different said arms for mutually independent adjustments therealong and about a vertical axis whereby the mounting of the blocks may conform to the spacing and lines of the draft tongues of the spacing of the draft bars.

5. A structure in accordance with claim 4 wherein the bracket arms are provided with upright longitudinal slots therethrough, and upright bolts are engaged through the blocks and slots to fix the blocks to the arms for the aforesaid adjustments thereof.

CECIL W. BODEN.